US006389667B1

(12) United States Patent
Cook et al.

(10) Patent No.: US 6,389,667 B1
(45) Date of Patent: May 21, 2002

(54) PISTON RING COMPRESSOR

(75) Inventors: James A. Cook, Delphi; Brad A. Moore, Frankfort; Kevin R. Shaffer, West Lafayette; James L. Thien, Logansport; Robert L. Walters, Lafayette, all of IN (US)

(73) Assignee: Caterpillar Inc., Peoria, IL (US)

( * ) Notice: Subject to any disclaimer, the term of this patent is extended or adjusted under 35 U.S.C. 154(b) by 43 days.

(21) Appl. No.: 09/606,297

(22) Filed: Jun. 29, 2000

(51) Int. Cl.[7] .................................................. B23P 15/10

(52) U.S. Cl. ........................................ 29/222; 29/200 P

(58) Field of Search ............................... 29/200 P, 222, 29/200 R, 200 J, 223, 224, 229; 254/10.5

(56) References Cited

U.S. PATENT DOCUMENTS

| | | | | |
|---|---|---|---|---|
| 1,572,801 A | * | 2/1926 | Kearney | 29/222 |
| 1,706,780 A | * | 3/1929 | Greene | 29/222 |
| 2,553,663 A | * | 5/1951 | Martin | 29/222 |
| 2,697,870 A | * | 12/1954 | Zucker | 29/222 |
| 3,561,091 A | * | 2/1971 | Pigozzi | 29/222 |
| 3,754,312 A | * | 8/1973 | Komorek | 29/222 |

* cited by examiner

*Primary Examiner*—Joseph J. Hail, III
*Assistant Examiner*—Daniel Shanley
(74) *Attorney, Agent, or Firm*—McGuireWoods LLP

(57) ABSTRACT

A piston ring compressor for compressing a piston ring about a circumference of a piston so that the piston can be inserted into a cylinder. The piston ring compressor includes a wall forming a hollow shaped member and an inner compression surface formed about the interior portion of the hollow shaped member. The inner compression surface has a diameter which gradually decreases from a second end to a first end. The piston ring compressor applies an even compressive force about the piston ring as the piston ring and piston are slid through the piston ring compressor from the second end to the first end.

16 Claims, 5 Drawing Sheets

PISTON RING COMPRESSOR

TECHNICAL FIELD

This invention relates generally to a piston ring compressor and more particularly to a piston ring compressor for compressing piston rings around grooves of a piston.

BACKGROUND ART

The introduction of a piston assembly into a cylinder bore of a combustion engine is a complex and awkward process. In order to accomplish this task, piston rings must be compressed around grooves of the piston while the entire piston assembly (including the connecting rod) is properly oriented and positioned with respect to the cylinder bore of the engine block. This process is further complicated by the fact that an operator or technician must apply a substantial amount of compression about the piston rings while at the same time installing the piston assembly into the cylinder bore of the engine block.

Many piston ring compressors are currently known and commercially used throughout the industry. One type of piston ring compressor includes a piston ring clamp having two ring halves connected together at one end by a hinge joint and at opposite ends by a screw device. The ring halves are pivoted into an open position and are positioned around the piston rings, and are then moved to a closed position for clamping and compressing the piston rings. The entire piston assembly is then pushed through the clamp into the cylinder of the engine block. An adjustable member such as, for example, a ratchet mechanism, is provided between the separable ends of the ring halves to adjust an inside diameter of the piston ring compressor. This prevents the ring halves from engaging the outer surface of the piston, thus ensuring that the piston assembly can be pushed out of the clamp and into the cylinder of the engine block. However, this piston ring compressor does not apply uniform compressive forces around the circumference of the piston rings, and cause a greater compressive force on portions of the piston ring than remaining portions of the piston ring. This non-uniform compressive force not only damages the piston rings but also hinders the ability of the piston assembly to slide through the clamp into the cylinder. A non-uniform compressive force may also require the operator or technician to apply a greater force during the insertion of the piston assembly into the cylinder. This, of course, adds to the awkward nature of inserting the piston assembly into the cylinder.

Another type of piston ring compressor uses overlapping bands to compress the piston rings about the piston. In these applications, two end sections of the band are attached via a lever. The lever is then actuated to compress the piston rings about the piston grooves. It is noted that in these piston ring compressors, an outer band of the piston ring compressor overlaps an inner band of the ring compressor. The overlapping bands provide an uneven compressive force about the piston rings and most notably an undue stress in the piston rings at the inner end of the inner band of the overlapping bands. It is further noted that the inner band tends to catch on the piston rings during the compression of the outer band, and in some instances prevents the piston assembly from being removed from the band and into the cylinder of the engine block.

In yet another type of piston ring compressor, a ring is provided which has a varying inner circumference. A lower portion of the ring has an inner circumference which is slightly smaller than the circumference of the piston rings, while an upper end of the ring has an inner circumference which is much smaller than the circumference of the piston rings (in an uncompressed state). In this type of piston ring compressor, the operator or technician places the larger diameter side of the piston ring compressor around the piston rings. As the piston assembly is slid through the piston ring compressor, the piston rings are compressed. In this system, the piston ring compressor tends to get caught on the piston rings during the initial mounting stage. This, in turn, damages the piston rings as well as uncouples the piston rings from the grooves of the piston.

The present invention is directed to overcoming one or more of the problems as set forth above.

DISCLOSURE OF THE INVENTION

In one aspect of the present invention a piston ring compressor is provided. The piston ring compressor has a wall forming a hollow shaped member which has a first end and a second end. An inner compression surface is formed about the hollow shaped member which has a diameter which gradually decreases from the second end to the first end.

In another aspect of the present invention, a piston ring is provided with a first and second wall having an inner compression surface. A hinge connects the first and second walls. When the first and second walls are moved to the closed position, the hollow shaped member is formed. The hollow shaped member has a diameter which gradually increases from a first end to a second end.

BEST MODE FOR CARRYING OUT THE INVENTION

Figure 1:
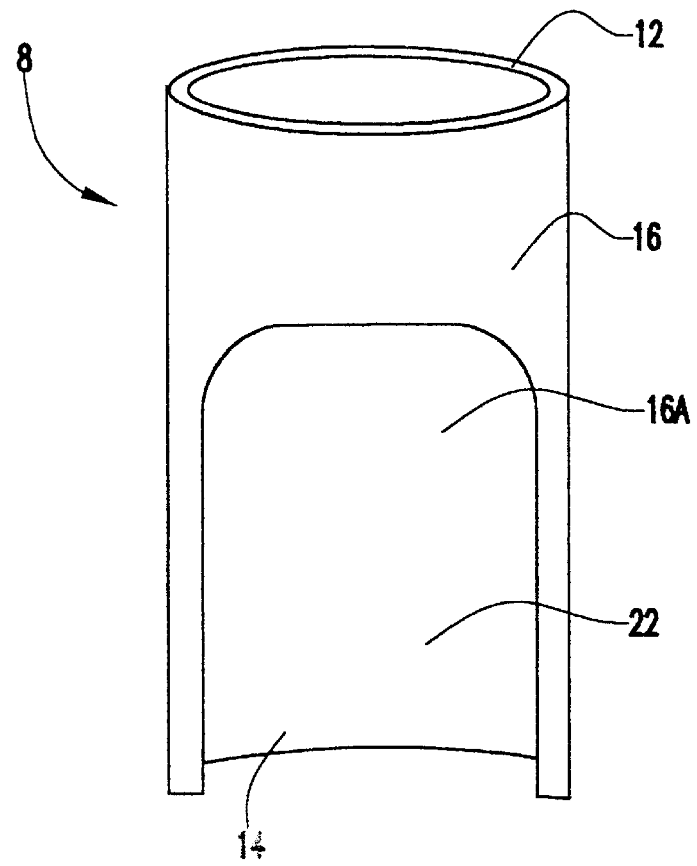
FIG. 1 shows a diagrammatic front plan view of the piston ring compressor according to an embodiment of the present invention.

Referring to FIG. 1, a diagrammatic front plan view of the piston ring compressor according to an embodiment of the present invention is shown. The piston ring compressor 8 includes a first open end (e.g., an upper end) 12 and a second open end (e.g., a lower end) 14. It should be understood by those skilled in the art that the lower end 14 does not have to be opened and thus may be partially or fully closed.

Still referring to FIG. 1, the piston ring compressor 8 includes a wall 16 extending between the upper end 12 and the lower end 14. The wall 16 is preferably cylindrically shaped, but may be square, polygonal and the like. The wall 16 also includes an inner compression surface 16*a*. A notch or cut-out 18 is formed in the wall 16, proximate the lower end 14 of the piston ring compressor 8.

The inner compression surface 16*a* forms a conical shape in the interior portion of the piston ring compressor 8. This interior conical shape coincides with the circumference of piston rings. The diameter of the inner compression surface 16*a* gradually decreases from the lower end 14 to the upper end 12. The larger diameter lower end 14 is slightly smaller than the circumference of the piston rings which surround the piston. The diameter of both the upper and lower ends 12, 14 may vary depending on the size of the piston rings and the piston.

Figure 2:
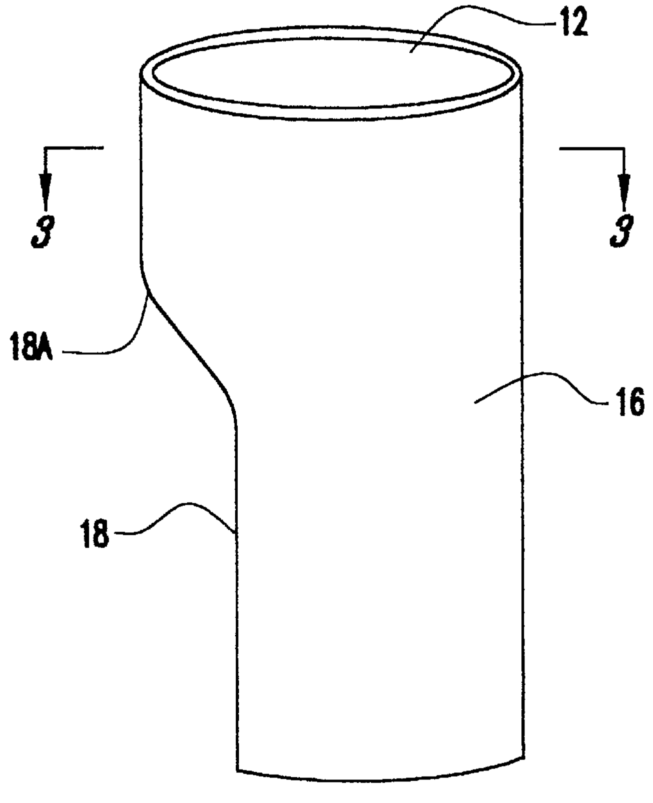
FIG. 2 shows a diagrammatic side plan view of the piston ring compressor according to an embodiment of the present invention.

FIG. 2 shows a diagrammatic side plan view of the piston ring compressor 8. A gradual sloping surface 18*a* is provided between the cut-out 18 and a portion of the wall 16.

Figure 3:
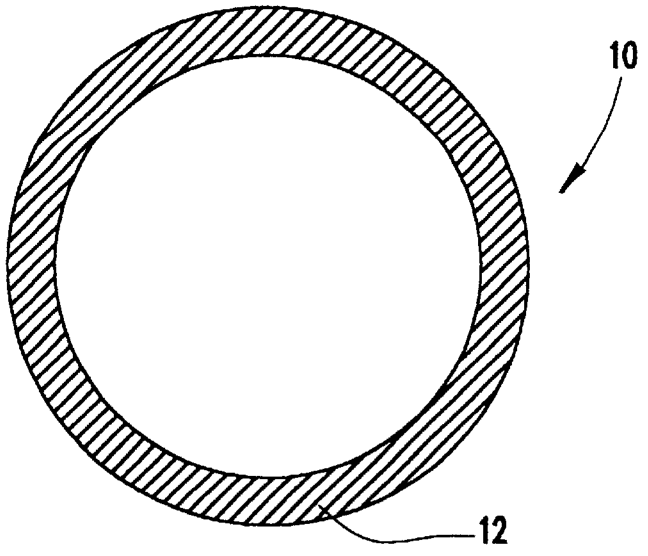
FIG. 3 shows a cut away view along line 3—3 of FIG. 2.

FIG. 3 shows a cut away view along line 3—3 of FIG. 2. The conical inner shape has a predetermined optimum diameter sized to compress the piston rings of a given size piston without over-compressing the piston rings. It is further noted that the inner diameter of the piston ring compressor 8 (at the upper end 12) should be equal to or slightly less than the diameter of the cylinder.

Figure 4A:
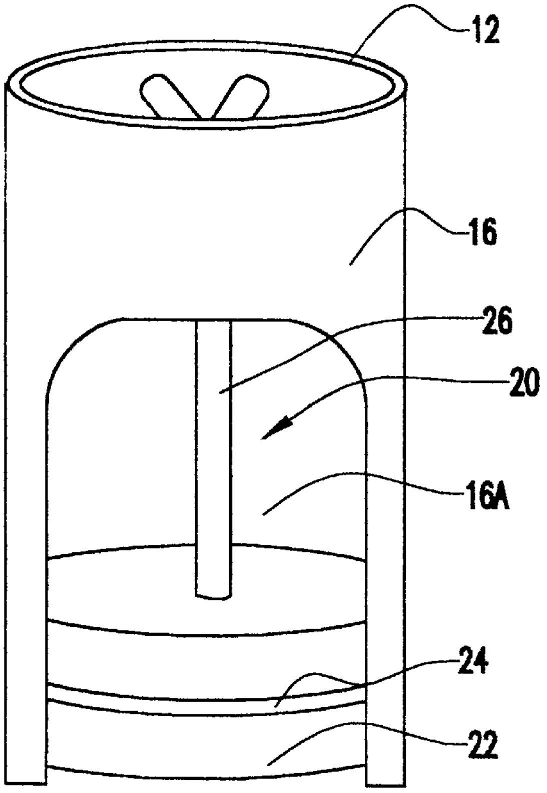
FIG. 4*a* shows a diagrammatic front plan view of the piston ring compressor of FIG. 1 with a piston ring in a partially engaged and compressed position.
Figure 4C:
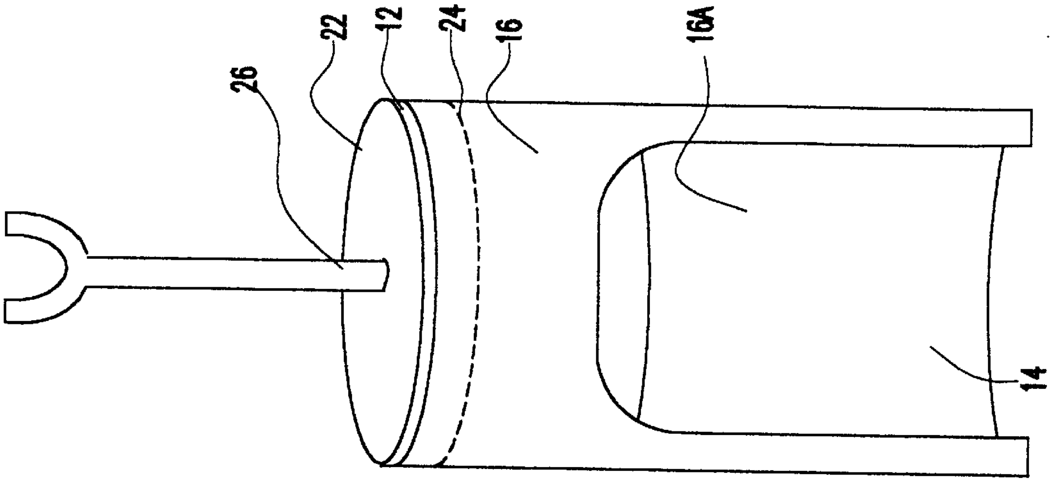
FIG. 4*c* shows a diagrammatic front plan view of the piston ring compressor of FIG. 1 with a piston ring in a completely engaged and compressed position.
Figure 4B:
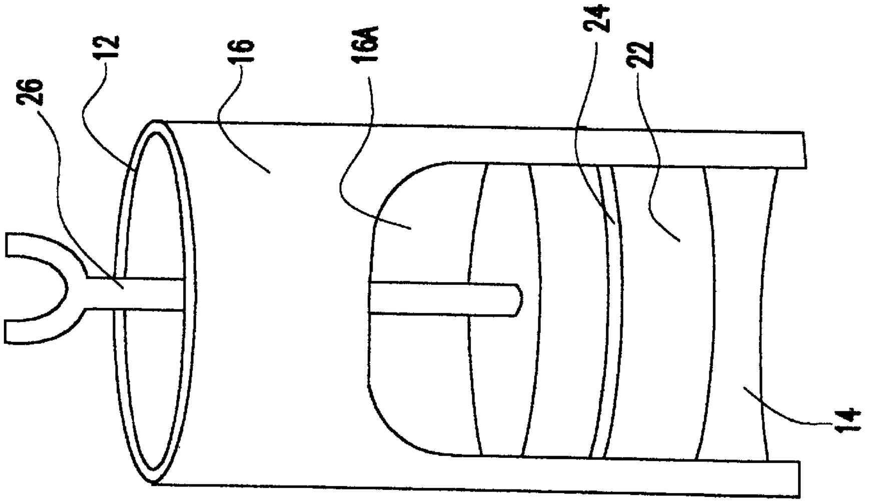
FIG. 4*b* shows a diagrammatic front plan view of the piston ring compressor of FIG. 1 with a piston assembly inserted therein.

FIGS. 4*a* through 4*c* show a piston assembly positioned within the piston ring compressor 8. As seen in FIG. 4*a*, the piston ring compressor 8 is approximately the same height as the piston assembly 20 (including the connecting rod 26). However, it should be understood by those skilled in the art that the piston ring compressor 8 may be a different height than the piston assembly 20 but should preferably be at least the height of the piston 22 and a portion of the connecting rod 26. As further seen in FIG. 4*a*, the cut-out 18 is at least the height of the piston 22.

FIG. 4*b* shows the piston assembly 22 in a position between the upper end 12 and the lower end 14. FIG. 4*c* shows the piston assembly 22 at the upper end 12.

Figure 5:
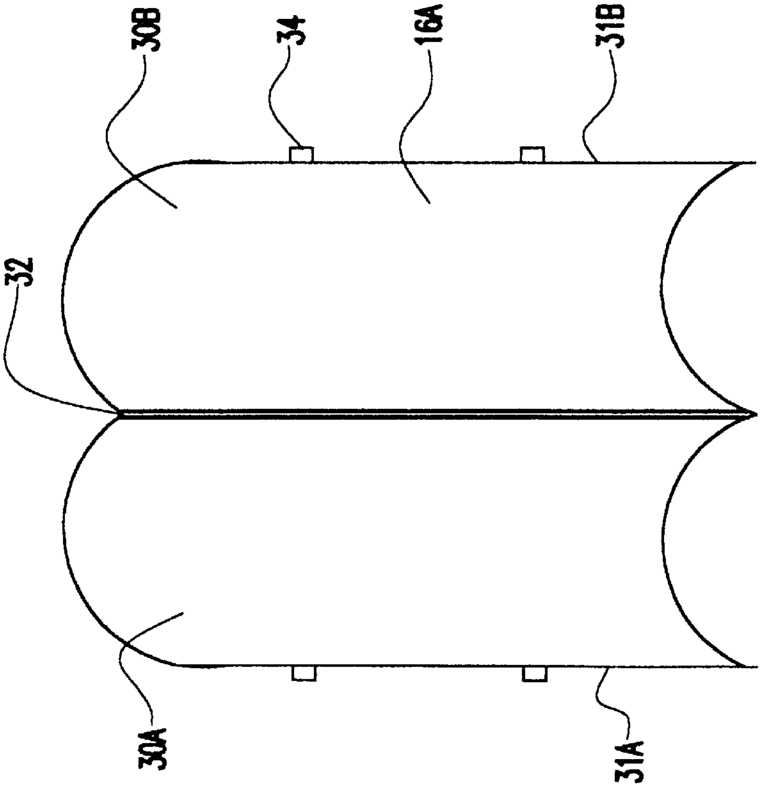
FIG. 5 shows a diagrammatic front plan view of the piston ring compressor according to another embodiment of the present invention.

FIG. 5 shows a diagrammatic front plan view of the piston ring compressor according to another embodiment of the present invention. In the embodiment of FIG. 5, two ring halves 30*a* and 30*b* are provided. The ring halves 30*a* and 30*b* are hinged together via a hinge 32 and include respective edges 31*a* and 31*b*. The hinge 32 may be any well known hinge such as, for example, a flexible strip of resilient material or a door-type hinge. In the closed position, the inner compression surface 16*a* is similar to the inner compression surface 16*a* of FIG. 1 and a description is thus omitted herein. As seen further in FIG. 5, connector devices 34 (e.g., latches or clamps) are positioned at edges of the two halves 30*a* and 30*b*. The connector devices 34 are used to lock the two halves 30*a* and 30*b* together when the two halves 30*a* and 30*b* are in the closed position of FIG. 7.

Figure 6:
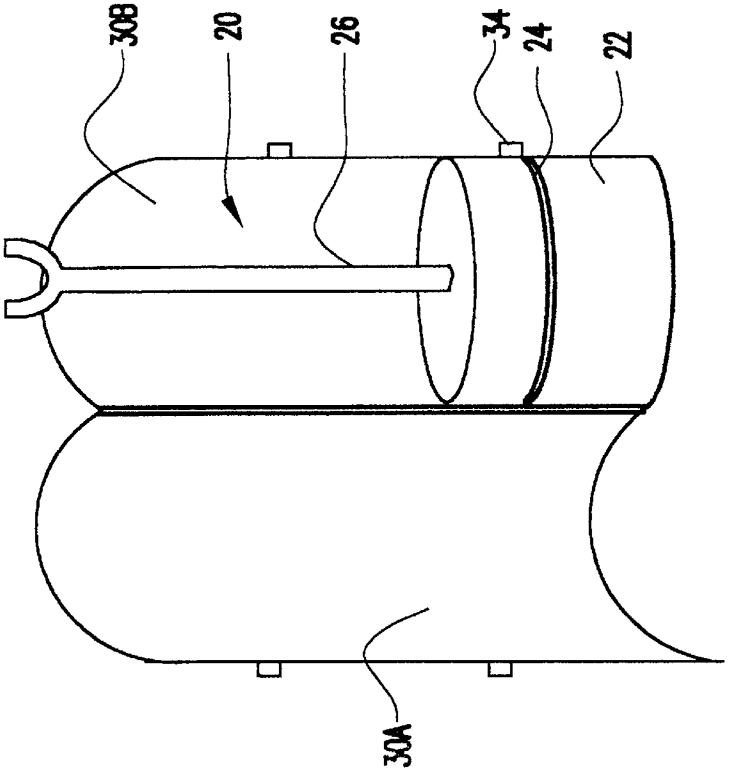
FIG. 6 shows a diagrammatic front plan view of the piston ring compressor of FIG. 5 with a piston assembly inserted therein.

FIG. 6 shows a diagrammatic front plan view of the piston ring compressor of FIG. 5 with a piston assembly inserted therein. In FIG. 6, the piston rings 24 rest against the inner compression surface 16*a*. At this stage, the piston rings 24 are not compressed against the piston.

Figure 7:
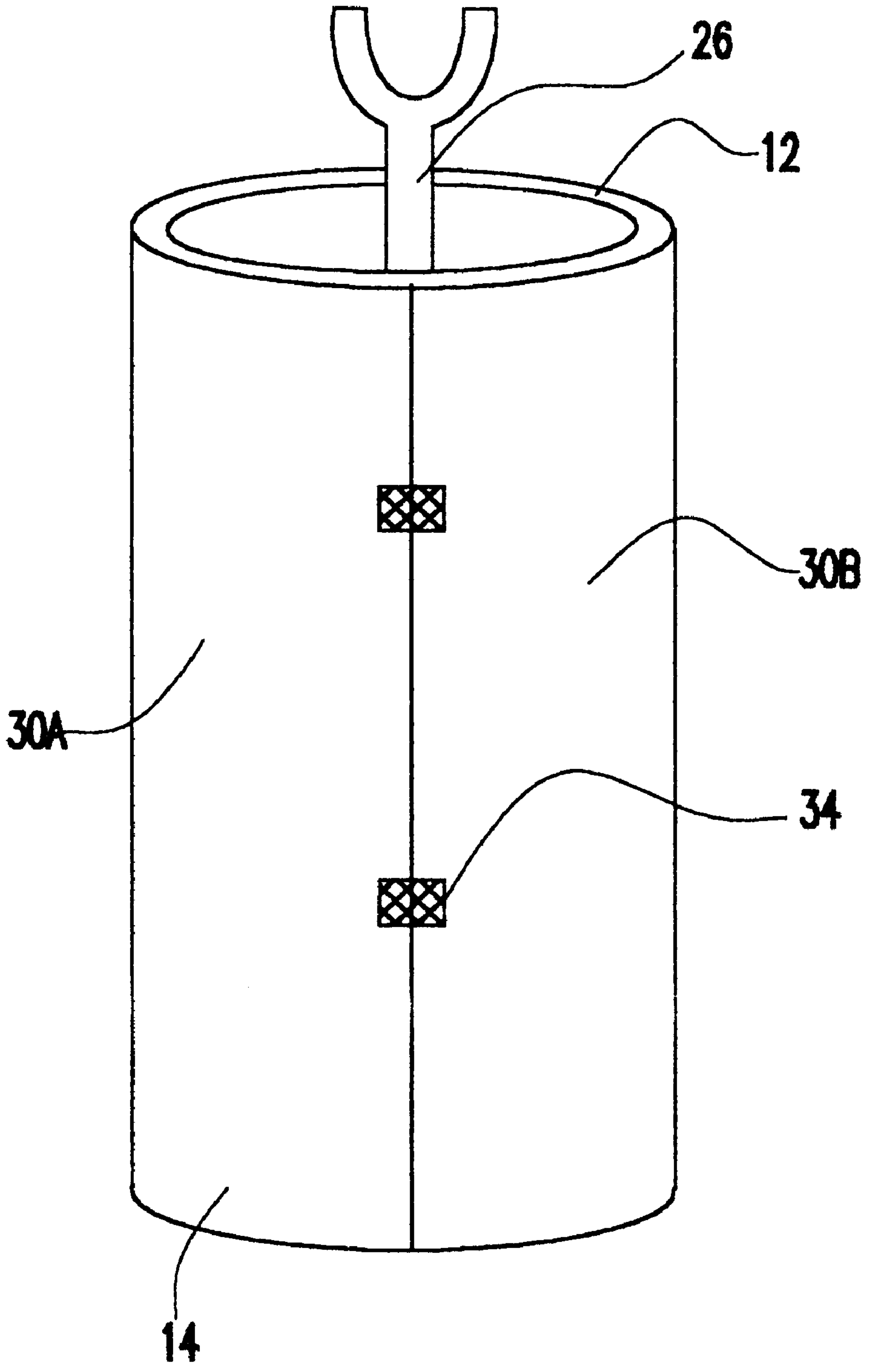
FIG. 7 shows a diagrammatic front plan view of the piston ring compressor of FIG. 5 with the piston ring in an engaged and compressed position.

FIG. 7 shows a diagrammatic front plan view of the piston ring compressor of FIG. 5 with the piston rings 24 in a partially engaged and compressed position. Similar to the embodiment of FIG. 1, when the two halves 30*a* and 30 are closed, a conical inner shape is formed which has a predetermined optimum diameter. In the position as shown in FIG. 7, the respective edges 31*a* and 31*b* abut one another when the ring halves 30*a* and 30*b* are in the closed position.

Industrial Applicability

In operation, a piston assembly is inserted within the notch or cut-out 18 formed in the wall 16. Once the piston assembly is inserted within the piston ring compressor 8, the piston assembly is slid through the piston ring compressor 8 from the lower end 14 to the upper end 12. The lower end 14 may be opened in order for an operator or technician to push the piston assembly through the piston ring compressor 8 and into the cylinder.

The piston rings 24 become partially compressed against the piston 22 when the piston assembly is initially inserted within the cut-out 18 of the piston ring compressor 8. As the piston assembly is slid upwards toward the upper end 14, the piston rings 24 become more compressed until the piston rings 24 are completely compressed at the upper end 14. The compression of the piston rings 24 arises due to the fact that the upper end 14 is sized so as to completely and fully engage and compress the piston rings 24 against the piston 22 when the entire piston assembly is slid through the piston ring compressor 8.

During the sliding operation, the inner compression surface 16*a* will not contact the piston surface thus ensuring that the piston assembly can be easily removed from the piston ring compressor 8. It is noted that the diameter of the inner diameter of the piston ring compressor 8 (at the upper end 12) is equal to or slightly less than the diameter of the cylinder thus preventing over-compression of the piston rings 24 and further ensuring smooth movement of the piston rings 24 over a joint between the piston ring compressor 8 and the cylinder block adjacent the cylinder.

In the second embodiment of the present invention, a piston assembly is placed between the ring halves 30*a* and 30*b*. The ring halves 30*a* and 30*b* are closed via the hinge 32, and the respective edges 31*a* and 31*b* are locked together via the connector devices 34. This ensures that the piston assembly will remain within the piston ring compressor 8 and also ensures that an even compressive force will be applied to the piston rings 24.

In the closed position, the inner compression surface 16*a* partly engages and compresses the piston rings 24 at the lower end 14. As the piston assembly is slid upwards toward the upper end 12, the inner compression surface 16*a* begins to compress the piston rings 24 against the piston 22. At the upper end 12, the piston rings 24 are fully compressed against the piston 22. The inner compression surface 16*a* will not contact the piston surface thus ensuring that the piston assembly can be easily removed from the piston ring compressor 8. Also, no uneven forces are applied to the piston rings 24 during the installation process.

Other aspects, objects and advantages of this invention can be obtained from a study of the drawings, the disclosure and the appended claims.

What is claimed is:

1. A piston ring compressor for compressing piston rings about a piston, said piston ring compressor comprising:

a contiguous wall forming a hollow shaped member having an interior portion, a first end and a second end, said first end being opened;

an inner compression surface formed about said interior portion of said hollow shaped member, said inner compression surface having a diameter which gradually decreases from said second end to said first end;

a cut-out section formed in said contiguous wall and extending into said hollow shaped interior portion proximate said second end and sized such that said piston with said piston rings can be inserted therethrough; and wherein said piston rings are compressed against said piston when said piston with said piston rings are inserted within said cut-out section and slide through said hollow interior portion.

2. The piston ring compressor of claim 1, wherein said lower end is one of opened, partially closed and fully closed.

3. The piston ring compressor of claim 1, wherein said diameter of said hollow shaped interior portion is adapted to be larger than an outer surface of said piston.

4. The piston ring compressor of claim 1, wherein said inner compression surface forms a conical shape from said first end to said second end.

5. The piston ring compressor of claim 4, wherein said conical shape inner compression surface is adapted to be substantially a same shape of a circumference of said piston.

6. The piston ring compressor of claim 1, wherein said wall is cylindrically shaped.

7. The piston ring compressor of claim 1, wherein said first end is an upper end and said second end is a lower end.

8. The piston ring compressor of claim 7, wherein said diameter of said inner compression surface at said upper end is sized such that said piston rings are fully engaged and compressed about said piston when said piston and said piston rings are slid from said lower end to said upper end.

9. The piston ring compressor of claim 1, wherein said inner compression surface is adapted to be larger than an outer surface of said piston.

10. The piston ring compressor of claim 9, wherein said diameter at said first end is one of equal to and slightly less than a diameter of a cylinder in which said piston is inserted therein.

11. The piston ring compressor of claim 10, wherein said diameter prevents over-compression of said piston rings and further ensures smooth movement of said piston rings over a joint between said piston ring compressor and an engine block adjacent the cylinder.

12. The piston ring compressor of claim 1, wherein said inner compression surface provides an even compressive force on said piston rings when said piston with said piston rings are slideable from said second end to said first end.

13. A piston ring compressor for compressing piston rings about a piston, said piston ring compressor comprising:

a first wall having an inner compression surface and an edge, said inner compression surface of said first wall having a semi-cylindrical shape;

a second wall having an inner compression surface and an edge, said inner compression surface of said second wall having a semi-cylindrical shape;

a hinge mounting said first wall with said second wall such that said first wall and said second wall are moveable between a closed position and an opened position;

wherein when said first wall and said second wall are moveable in said closed position said edge of said first wall and said edge of said second wall abut against one another; and wherein when said first wall and said second wall are moveable in said closed position a hollow shaped member is formed having a first end, a second end and a diameter which gradually increases from said first end to said second end.

14. The piston ring compressor of claim 13, including connector devices for connecting said first wall and said second wall at said edges when said first wall and said second wall are moveable in said closed position.

15. The piston ring compressor of claim 14, wherein said connector devices apply even compressive forces to said piston rings when said piston with said piston rings are slid between said second end and said first end.

16. The piston ring compressor of claim of claim 15, wherein said inner compression surface of said first wall and said second wall apply an even compressive force against said piston rings when said first wall and said second wall are moveable in said closed position.

* * * * *